United States Patent [19]

Albertazzi

[11] 4,084,322

[45] Apr. 18, 1978

[54] APPARATUS FOR MEASURING GEOMETRICAL DIMENSIONS AND/OR ERRORS ON A MECHANICAL PART

[75] Inventor: Gastone Albertazzi, Bologna, Italy

[73] Assignee: Finike Italiana Marposs Soc. In. Accomandita Semplice di Mario Possati & C., Bentivoglio, Italy

[21] Appl. No.: 689,839

[22] Filed: May 25, 1976

[30] Foreign Application Priority Data

Jun. 13, 1975 Italy ................................. 3442 A/75

[51] Int. Cl.² .......................... G01B 7/00; G01B 7/12
[52] U.S. Cl. .................................. 33/174 L; 33/174 Q
[58] Field of Search .......................... 33/174 Q, 174 L

[56] References Cited

U.S. PATENT DOCUMENTS

| 2,030,237 | 2/1936 | Brittain, Jr. et al. ............. 33/174 Q |
| 2,785,799 | 3/1957 | Esken ................... 33/174 L |
| 3,943,632 | 3/1976 | Albertazzi ......................... 33/174 L |

FOREIGN PATENT DOCUMENTS

| 78,021 | 10/1931 | Sweden ............................. 33/174 L |

*Primary Examiner*—Richard E. Aegerter
*Assistant Examiner*—Richard R. Stearns
*Attorney, Agent, or Firm*—Stevens, Davis, Miller & Mosher

[57] ABSTRACT

Apparatus for measuring geometrical dimensions and-/or errors on a mechanical part which includes a base, first and second supports, measuring devices, a first activating device coupled with the second support to control relative displacement between the two supports in order to cause feelers to cooperate with respective portions of the part, a locking device supported by the base to lock the part during measurement, a second activating device adapted to cause relative movement between the part and the measuring devices to permit feelers to explore respective portions of the part, a processing device to process signals supplied by transducers during the exploration of feelers on the part, thrust arms associated with the first support to support the part, first reference elements associated with the second support to cooperate mechanically with the part and push it towards the first support after the action of the first activating device overcomes the action of the thrust arms, second reference elements associated with the second support to cause the stopping of the first activating device at a first relative position of the supports, a micro switch and a control solenoid valve connected to the locking device to control the locking of the part when the first relative position of the two supports is reached and a seat and piston adapted to cause the loosening of the first reference elements from the part to permit relative movement between the part and the measuring devices and the consequent effecting of the measurements.

11 Claims, 3 Drawing Figures

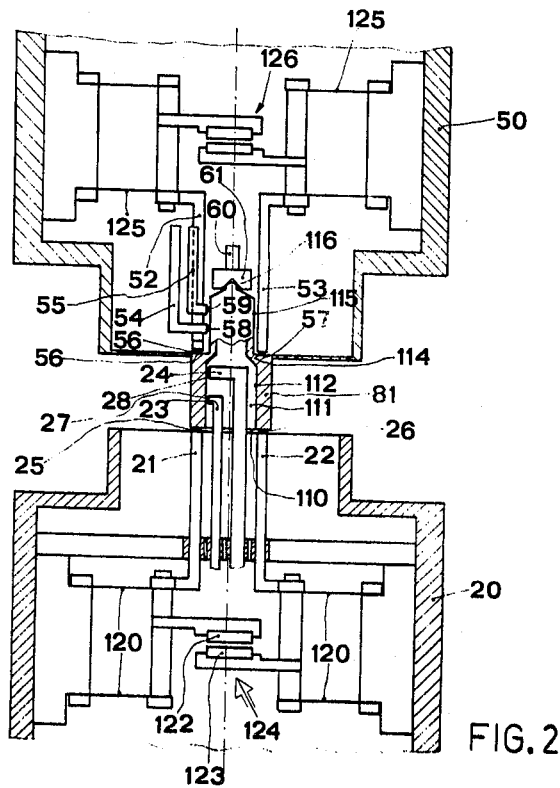
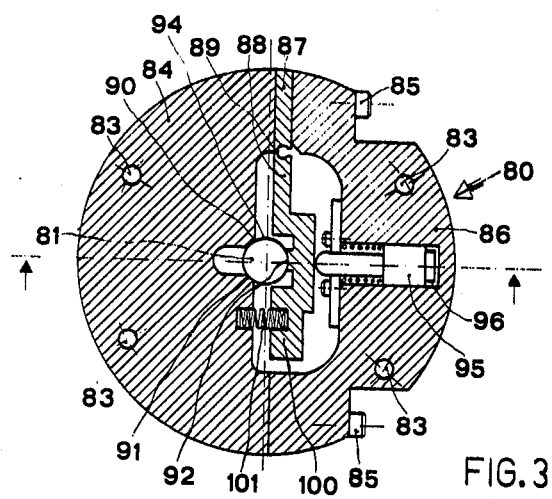

APPARATUS FOR MEASURING GEOMETRICAL DIMENSIONS AND/OR ERRORS ON A MECHANICAL PART

The present invention relates to an apparatus for measuring geometrical dimensions and/or errors on a mechanical part and particularly for the measurement, by direct-contact feelers, of errors in perpendicularity and concentricity between different surfaces having symmetry of rotation.

For effecting this type of measurement, apparatus are already known which comprise positioning and locking devices, actuating devices and measuring devices.

The positioning and locking devices comprise mechanical reference elements which, by cooperating with the part, lock it in a given position.

Once the part has been positioned, the actuating devices and the measuring devices enter into operation.

The actuating devices, by acting on the part or on the measuring devices, make it possible for the latter to explore relative surfaces of the part.

This exploring can be obtained, for instance, by causing the part to rotate around an axis determined by the locking devices.

The need, which exists for such known apparatus, of causing a large number of separate positioning and locking, measuring and actuating elements to act on the part is opposed, in the case of small parts or parts of special shape, by the limitation or even the absolute insufficiency of the space available for such multiple separate elements.

It is therefore, one purpose of the present invention to provide an apparatus for the measurement of geometrical dimensions and/or errors on a mechanical part which, although requiring only a reduced amount of space, makes it possible to obtain a very accurate positioning and therefore a very accurate measurement of the part.

Another object of the invention is to provide a measuring apparatus with direct contact feelers which are able to measure parts of very small dimensions or of such shape as to make the positioning and locking of the part by apparatus of the traditional type difficult or impossible.

Another object of the invention is to provide an apparatus for the measuring of errors in perpendicularity and concentricity between different surfaces of the cylinder of an injector for diesel engines.

These purposes and still others are achieved by an apparatus for the measuring of geometrical dimensions and/or errors on a mechanical part which comprises:
a base;
a first support mounted on the base;
a second support mounted on the base;
measuring means mounted on at least one of said first and second supports, said measuring means comprising movable feeling means having at least one movable arm with a direct contact feeler and position transducing means which are responsive to the position of the feeler means;
first actuating means coupled to at least one of said first and second supports to produce a relative displacement between the two supports so as to cause said feeler means to cooperate with respective portions of the part;
a locking device supported by said base in order to lock the part;
second actuating means adapted to cause a relative movement between the part and the measuring means in order to permit said feeler means to explore the respective portions of the part; and
processing means connected with said measuring means to process the signals supplied by the transducer means during the exploring of the part by the feeler means;
the apparatus being characterized by:
thrust means associated with at least one of the supports for supporting the part;
first reference means associated at least with the other of said supports in order to cooperate mechanically with the part and push it towards said at least one support as a result of the action of said first actuating means, overcoming the action of said push means;
second reference means associated with at least one of said supports for causing the stopping of said first actuating means at a first relative position of said supports;
first control means connected to said locking device for controlling the locking of the part upon the reaching of said first relative position of the two supports;
second control means adapted to cause the disconnecting of said first reference means from the part in order to permit said relative movement between the part and the measuring means and the consequent effecting of the measurements.

The invention will be described in further detail with reference to the accompanying drawings, which are given solely by way of illustration and not of limitation, and in which:

FIG. 2 is a sectional view along the plane II—II through certain parts of the apparatus of FIG. 1; and FIG. 3 is a view, partially in cross-section, along the plane III—III, of other elements of the apparatus shown in FIG. 1.

Figure 1:
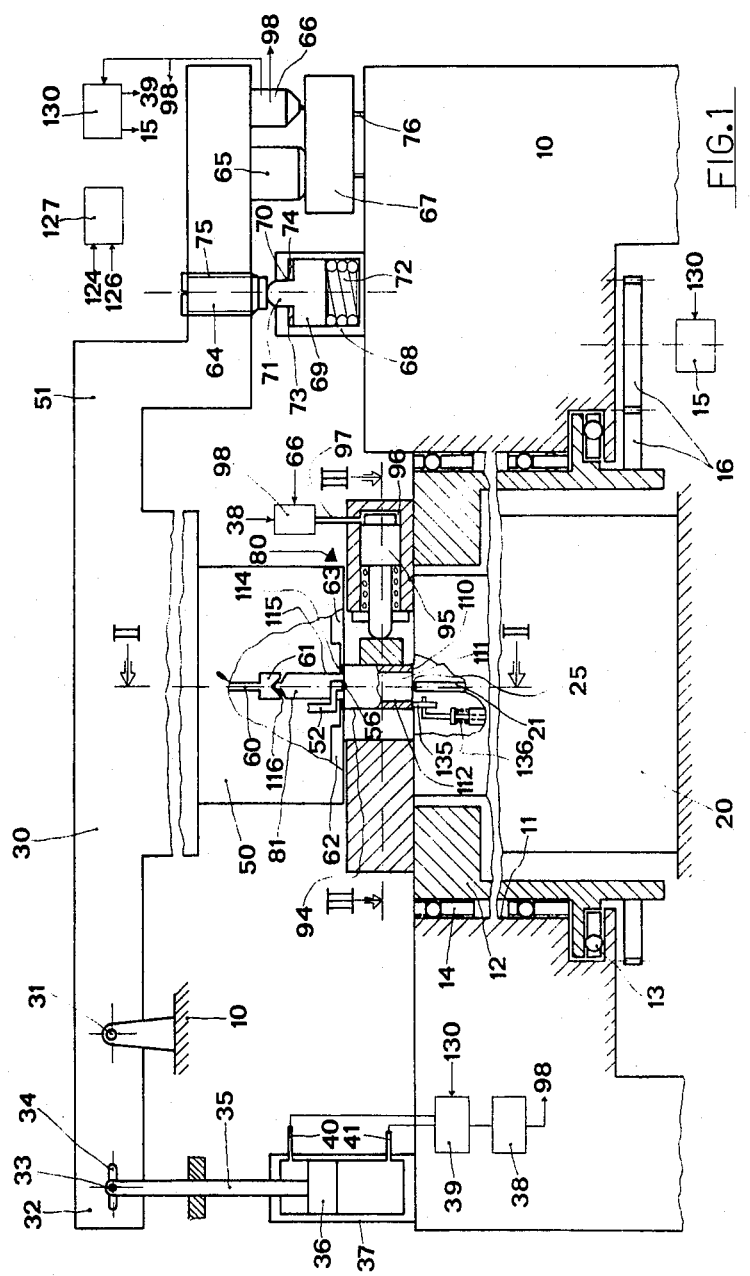
FIG. 1 is a side view, partially in section, of a preferred embodiment of the apparatus in accordance with the invention.

Referring to FIG. 1, the apparatus comprises a base 10 in which there is provided a cylindrical seat 11. Within the seat there is housed an element 12 having substantially the shape of a hollow cylinder, which rests on a thrust bearing 12 and can rotate with respect to the seat 11 on other bearings 14.

The rotation is transmitted to the cylinder 12 from a motor 15 via a system of gears 16.

Within the cylinder 12 there is contained, rigidly fastened to the base 10, a measurement group formed of a shell 20 from which there protrude (FIG. 2) two pairs of movable arms 21, 22 and 23, 24 which bear feelers 25, 26 and 27, 28, respectively, at their ends.

A load-bearing arm 30 is pivoted on a pin 31 with respect to the base 10; one branch 32 of the arm 30 is connected, via a pin 33 slidable in a guide 34, to a shaft 35 which terminates in a piston 36.

The piston 36 is contained within a cylinder 37 fastened to the base 10 and is actuated pneumatically by a pneumatic group 38 via a solenoid 39 and two conduits 40, 41.

A second measuring group protected by a shell 50 is fastened to the branch 51 of the arm 30 opposite the branch 32 with respect to the pin 31.

within the shell 50 there are arranged (FIG. 2) a first pair of movable arms 52, 53 with corresponding feelers 56, 57, a second pair of movable arms 54, 55 with corresponding feelers 58, 59 and a final movable arm 60 with corresponding feeler 61.

To the shell 50 there are also fastened (FIG. 1) two reference elements 62, 63, while other reference elements 64, 65 and a micro-switch 66 are fastened to the branch 51 of the arm 30.

On the base 10 there are mounted a reference element 67 and a seat 68 in which a piston 69 is movable. In the seat 68 there is provided an opening 70 for the passage of a stop 71 which is rigidly connected with the piston 69.

A spring 72 acts on the piston 69, urging it to bring the stop 71 into contact with the reference element 64.

The piston 69 is provided with a striking surface 73 which can cooperate with a striking surface 74 provided in the seat 68.

The position of the reference elements 64 and 67 is adjustable by means of the threaded couplings 75 and 76 to the arm 30 and to the base 10 respectively.

A mandrel 80 for the locking of the part 81 to be measured, consisting of the cylinder of an injector for a diesel engine, is connected to the cylinder 12 by screws (FIG. 3). The mandrel 80 comprises a first element 84 to which a second element 86 is fastened by screws 85.

Between the elements 84 and 86 there is clamped a bar 87 which supports a movable arm 88 via an intermediate section 89 which is very thin and flexible.

On the element 84 there are provided two surfaces 90, 91 which, together with a third surface 92 provided on the arm 88, are adapted to lock the part 81, by closing on a cylindrical surface 94 of said part.

The arm 88 can be pushed towards the element 84 by a stop rigidly connected with a piston 95 housed in a cavity 96 provided in the element 86.

The piston 95 can be actuated by the pneumatic group 38 via a control solenoid valve 98 and a conduit 97. Between the element 84 and the free end 100 of the arm 88 there is inserted a spring 101 which urges the arm 88 away from the element 84.

The part 81 has a base surface 110 in the shape of a circular crown which during the measurement is touched by the feelers 25, 26 while the feelers 27, 28 penetrate into a hole 111 and touch an inner cylindrical surface 112. The feelers 56, 57 touch the part on an intermediate surface 114 which also has the shape of a circular crown; the feelers 58, 59 touch an outer cylindrical surface 115 and the feeler 61, which has the shape of a conical seat, cooperates with the surface 116 having the shape of a spherical cap. The arms 21 and 22 are mounted on the shell 20 by flat springs 120 and bear two movable elements 122, 123 of an inductive positive transducer 124.

Similarly, the other arms 23, 24 and 52, 53, 54, 55 and 60 are mounted on the shell 20 and 50 respectively by similar springs, only some of which (125) are shown, and bear respective movable elements of other position transducers.

In FIG. 2 there are shown only the position transducers 124, 126 associated with the movable arms 21, 22 and 52, 53.

The electrical circuits of the position transducers are connected to a feed and processing unit 127. The operation of the apparatus is as follows: air under pressure is initially sent to the cylinder 37 through the conduit 40 so that the piston 36 is brought towards the lower end of the cylinder 37 (FIG. 1). Therefore the arm 30 rotates in counterclockwise direction and the branch 51 moves away from the base 10; the shell 50 moves away from the shell 20.

Between the two shells there is then sufficient space to introduce the part 81 to be measured; the introduction of the part may be effected either manually or by means of loading devices (not shown).

The part 81 is placed into the mandrel 80 between the fixed surfaces 90, 91 and the movable surface 92 which is in its open position since the cavity 96 is not fed with air under pressure and therefore the arm 88 is held spaced from the element 84 by the thrust of the spring 101.

The part 81 is pressed against the feelers 25, 26 which touch the surface 110 at two diametrically opposite points while the feelers 27, 28 touch the surface 112 at two points which are located on one of its generatrices.

After the part 81 has been brought against the feelers 25, 26, a signal is produced by a switch, not shown, which can be actuated manually or automatically, for instance by the loading devices, if the latter are provided.

The signal causes the solenoid valve 39 to shift, causing the introduction of air under pressure into the cylinder 37 through the conduit 41.

The piston 36 is pushed upward causing a clockwise rotation of the arm 30 and therefore a lowering of the branch 51 towards the base 10.

The shell 50 approaches the part 81 and at a given point the feelers 56, 57 come into contact with two diametrically opposite points of the surface 114 and the feeler 61 comes into contact with the surface 116.

The springs 120 which provide the measuring pressure to the feelers 25, 26 are stiffer than the springs which act on the feelers 56, 57 and 61 so that, upon the continued lowering of the shell 50, the latter are initially compressed. As a result, the feelers 56, 57 and 61 re-enter with respect to the shell 50 until the surface 114 is touched by the reference elements 62, 63, which push the part 81 downward.

The part, in its turn, causes the feelers 25, 26 to enter again into the shell 1, compressing the springs 120.

At this point, the reference element 65 fastened to the branch 51 enters into contact with the reference element 67 fastened to the base 10, causing the stopping of the arm 30.

The reference element 64 has previously touched the stop 71, causing the piston 69 to enter again into the seat 68 and compress the spring 72.

The stopping of the arm 30 is detected by the micro-switch 66 which touches the reference element 67 at the same time as the element 65 and emits a signal.

The signal of the micro-switch 66 causes the actuating of the solenoid valve 98 and the consequent introduction of air under pressure into the cavity 96.

The stop which is rigidly connected to the piston 95 pushes the arm 88 towards the surfaces 90, 91, and the part 81 is locked between the surfaces 90, 91 and the surface 92 of the arm 88. The signal of the micro-switch 66 also arrives at a unit 130 comprising delay circuits which, after a period of time sufficient to guarantee that the part 81 has been locked, control the switching of the solenoid valve 39 and the consequent connecting of the conduit 41 to the outer atmosphere.

The arm 30 therefore rests on the base 10 only by its own weight; the spring 72, which was compressed during the clockwise rotation of the arm 30, is dimensioned in such a manner as to exercise, under these conditions, a thrust which is greater than the weight of the said arm.

The branch 51 is therefore brought rearward by a certain amount, which is determined by the stroke which the piston 69 carries out until the surfaces 73, 74 come into contact.

The shell 50, fastened to the arm 30, is raised with respect to the part 81 and the reference elements 62, 63 move away from the surface 114 of the part, which however continues to be touched by the feelers 56, 57.

By suitably regulating the position of the reference element 67, it can be seen to it that at the moment when a master part 81 is locked by the mandrel 80 the displacement of the feelers 25, 26 has been such as to bring the movable elements 122, 123 of the transducer 124 into a predetermined relative "zero" or "zeroing" position.

In similar manner, by regulating the position of the reference element 64 the result can be obtained that the amount of the recoil of the arm 30 in the presence of a locked master part 81 is such as to bring the transducer 126 and the transducer associated with the movable arm 60 into zeroing condition.

After the recoil of the arm 30 the correct relative positioning is obtained between the shells 20, 50 and the part 81, and the measurements can be effected.

For this purpose, the signal of the micro-switch 66 causes the actuating of the motor 15 via other delay circuits of the unit 130.

These last-mentioned delay circuits guarantee the reaching of the final position of the arm 30.

The motor 15 places the part 81 in rotation by the gears 16, the cylinder 12, and the mandrel 80; the signals generated, during the rotation of the part 81, by the transducers 124, 126 and by the other transducers associated with the movable arms 23, 24, 54, 55, 60 depend on the variations in position of the surfaces 110, 112, 114, 115, 116 with respect to the axis of rotation.

The unit 127 effects a processing of the signals, assuming as reference the variations in position of the surface 112 and referring the variations of position of the other surfaces to it.

The results of the processing, which may be shown, by indicating instruments incorporated in the unit 127, are the errors in perpendicularity or concentricity of the surfaces 110, 114, 115, 116 with respect to the surface 112. After a full rotation of the part 81 a signal is generated, for instance by a device, not shown, which is sensitive to the rotation of the motor 15, in order to stop the motor and shift the solenoid valves 39 and 98.

The solenoid valve 39 controls the introduction of air under pressure, via conduit 40, into the cylinder 37 in order to cause the arm 30 to return to its initial position of rest. The solenoid valve 98 connects the chamber 96 with the outer atmosphere so that the arm 88, due to the thrust of the spring 101, moves away from the element 84.

The part 81 measured is thus free and may be removed from the measuring station manually or possibly by automatic unloading devices.

It is obvious that numerous structural or functional changes may be made in various elements of the apparatus without thereby going beyond the scope of the invention.

For example, the bearing arm 30, instead of being pivoted at 31 could be movable on a slide with respect to the base 10. Or instead of the upper shell 50, the lower shell 20 can be movable.

Furthermore, additional elastic thrust elements can be inserted into the shell 20 so as to act in parallel with the thrust elements associated with the measurement arms 21, 22 in order to support the part 81.

For example, there can be used for this purpose a pair of rollers 135 pushed to the outside of the shell by suitable springs 136 (FIG. 1) which during the rotation of the part remain in contact with the surface 110, rolling freely on it.

Or instead of the rollers there can be used two small pneumatic pistons which are pushed yieldably to the outside during the movement of lowering of the shell 50 and are retracted after the closing of the mandrel 80 on the part 81, before the latter starts to rotate.

What is claimed is:

1. Apparatus for measuring geometrical dimensions and/or errors on a mechanical part, comprising:
   a base;
   a first support carried by said base;
   a second support carried by said base, the second support being movable with respect to the base;
   measuring means mounted on at least one of said first and second supports, said measuring means comprising movable feeler means with at least one movable arm having a direct-contact feeler and position transducer means responsive to the position of the feeler means;
   first actuating means coupled with said second support to control a relative displacement between the two supports in order to move said supports toward and away from each other;
   a locking device movably carried by said base and adapted to cooperate with said part to lock and support the part in a fixed position with respect to said locking device;
   second actuating means adapted to cause a relative movement between said locking device with said part and said base in order to permit said feeler means to explore the respective portion of said part;
   processing means connected with said measuring means to process the signals supplied by the transducer means during the exploration of the feeler means on said part;
   thrust means carried by said first support for cooperating with said part and applying a supporting thrust to the latter;
   first reference means carried by the second support in order to cooperate mechanically with said part and push it towards the first support after the action of said first actuating means, overcoming the action of said thrust means;
   second reference means associated with at least said second support to cause the stopping of said first actuating means at a first relative position of said supports;
   first control means connected to said locking device to control the locking of said part when the first relative position of the two supports is reached;
   second control means adapted to deactivate said first actuating means in response to the two supports reaching said first relative position; and
   further thrust means adapted to cause, upon deactivation of said first actuating means, the movement of said second support and of said first reference means from said part to a predetermined measuring position with respect to said base to permit said relative movement between said part and the measuring means and the consequent effecting of the measurements.

2. The apparatus according to claim 1, wherein said measuring means comprise first measuring means and second measuring means mounted on said first support and said second support, respectively, the first and second measuring means including relevant movable feeler means with at least one movable arm having a direct-contact feeler and relevant position transducer means responsive to the position of the corresponding feeler means.

3. The apparatus according to claim 2, wherein said first support is fixed with respect to said base.

4. The apparatus according to claim 2, wherein said second reference means comprises sensor means adapted to detect the reaching of said first relative position of the supports and to supply a qualifying signal to the first and second control means and to the second actuating means.

5. The apparatus according to claim 3, wherein said locking device comprises a body which rotates with respect to the base and a mandrel supported by said body.

6. The apparatus according to claim 5, wherein said mandrel comprises a member rigidly connected with said rotating body, said member defining a first resting surface for said part; an element supported by said member and movable with respect thereto, said element defining a second resting surface for said part; a control device adapted to act on said element to cause a relative movement of said resting surfaces in order to lock said part; and unlocking means adapted to act on said element to cause a relative movement, opposite the preceding movement, of said resting surfaces in order to unlock said part.

7. The apparatus according to claim 6, wherein said movable element is formed of an arm movable toward and away from said member, said control device comprises a piston adapted to cooperate mechanically with said arm and said unlocking means comprise an elastic member adapted to exert on said arm a different action from that of said piston.

8. The apparatus according to claim 7, wherein said second actuating means comprise a motor mechanically coupled to said body to place it in rotation and said second reference means comprise a sensor device associated with said first support and second support to detect the reaching of said first relative position of the supports and to supply a qualifying signal to said motor and said piston.

9. The apparatus according to claim 3, wherein said feeler means of said measuring means mounted on said first support comprise a first pair of movable arms having relative feelers adapted to cooperate with a base surface of said part having the shape of a circular crown, and the feeler means of the measuring means mounted on said second support comprise a first pair of movable arms adapted to cooperate with an intermediate surface of said part having the shape of a circular crown.

10. The apparatus according to claim 9, wherein said feeler means of the measuring means mounted on said first support comprise a second pair of movable arms with corresponding feelers adapted to cooperate with an inner cylindrical surface of said part adjacent said base surface and the feeler means of the measuring means mounted on said second support comprise a second pair of movable arms with relative feelers adapted to cooperate with an outer cylindrical surface of said part adjacent the end of the part opposite said base and a further movable arm with relative feeler adapted to cooperate with said end of the part opposite said base.

11. The apparatus according to claim 10, wherein said locking device comprises a mandrel which is turnable and adapted to secure and lock said part at said outer cylindrical surface adjacent said base surface, said second actuating means comprise a device coupled to said mandrel to being it into rotation, and said processing means comprise circuits adapted to process the signals supplied by the position transducer means of the measuring means in order to calculate the errors in perpendicularity of said base surface and said intermediate surface with respect to said inner cylindrical surface, the errors in concentricity of said outer cylindrical surface adjacent the end of the part opposite said base with respect to said inner cylindrical surface and the errors in concentricity of said end of the part opposite said base with respect to said inner cylindrical surface.

* * * * *

UNITED STATES PATENT AND TRADEMARK OFFICE
CERTIFICATE OF CORRECTION

PATENT NO. : 4,084,322
DATED : April 18, 1978
INVENTOR(S) : Gastone ALBERTAZZI

It is certified that error appears in the above—identified patent and that said Letters Patent are hereby corrected as shown below:

Column 2, line 47, change "12" to -- 13 --

Column 2, line 67, change "within" to -- Within --

Column 3, line 52, change "positive" to -- position --

Column 4, line 42, change "1" to -- 20 --

Signed and Sealed this

Twenty-first Day of November 1978

[SEAL]

Attest:

RUTH C. MASON
Attesting Officer

DONALD W. BANNER
Commissioner of Patents and Trademarks